US009286708B2

(12) United States Patent
Takanashi

(10) Patent No.: US 9,286,708 B2
(45) Date of Patent: Mar. 15, 2016

(54) INFORMATION DEVICE, IMAGE COMBINING METHOD, AND COMPUTER-READABLE RECORDING MEDIUM

(71) Applicant: JVC KENWOOD Corporation, Yokohama-shi (JP)

(72) Inventor: Hiroaki Takanashi, Fujisawa (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/618,966

(22) Filed: Feb. 10, 2015

(65) Prior Publication Data
US 2015/0154781 A1   Jun. 4, 2015

Related U.S. Application Data

(63) Continuation of application No. PCT/JP2013/068687, filed on Jul. 8, 2013.

(30) Foreign Application Priority Data

Aug. 10, 2012 (JP) ................. 2012-179026

(51) Int. Cl.
*G06T 11/60* (2006.01)
*G01C 21/36* (2006.01)
*G06F 9/44* (2006.01)
(Continued)

(52) U.S. Cl.
CPC ............ *G06T 11/60* (2013.01); *G01C 21/3697* (2013.01); *G06F 3/041* (2013.01);
(Continued)

(58) Field of Classification Search
CPC .................................. G01C 21/3697
See application file for complete search history.

(56) References Cited

U.S. PATENT DOCUMENTS

| 2012/0130720 A1* | 5/2012 | Suda .............................. 704/276 |
| 2013/0190978 A1 | 7/2013 | Kato et al. |
| 2014/0018056 A1* | 1/2014 | Miyake et al. ................ 455/418 |

FOREIGN PATENT DOCUMENTS

| JP | 2010-130553 A | 6/2010 |
| JP | 2011-027482 A | 2/2011 |
| WO | WO-2012/036279 A1 | 3/2012 |

OTHER PUBLICATIONS

International Search Report and Written Opinion issued in PCT Application No. PCT/JP2013/068687 dated Sep. 17, 2013.

*Primary Examiner* — Zhengxi Liu
*Assistant Examiner* — Grace Q Li
(74) *Attorney, Agent, or Firm* — Venable LLP; Michael A. Sartori; Todd R. Farnsworth

(57) ABSTRACT

An information device includes an image receiving unit receiving an information terminal image having a specific region composed of pixels having a same feature value from an information terminal, the feature value being luminance or chromaticity; a specific region detecting unit detecting the specific region within the information terminal image, based on feature values of pixels composing the information terminal image received by the image receiving unit; an information device image creating unit creating an information device image related to a function provided to the information device; a composite image creating unit creating a composite image where the information device image created by the information device image creating unit is embedded in the specific region detected by the specific region detecting unit within the information terminal image; and a display control unit displaying the composite image created by the composite image creating unit on a display apparatus.

5 Claims, 12 Drawing Sheets

(51) Int. Cl.
*G06F 3/041* (2006.01)
*G06F 3/0486* (2013.01)
*G06F 3/14* (2006.01)
*G06F 3/0488* (2013.01)

(52) U.S. Cl.
CPC ............ *G06F 3/0416* (2013.01); *G06F 3/0486* (2013.01); *G06F 3/04883* (2013.01); *G06F 3/1438* (2013.01); *G06F 8/38* (2013.01); *G06F 2203/04803* (2013.01)

FIG.3

| FUNCTION | SIZE |
|---|---|
| RADIO | 240*400 |
| CD | 480*520 |

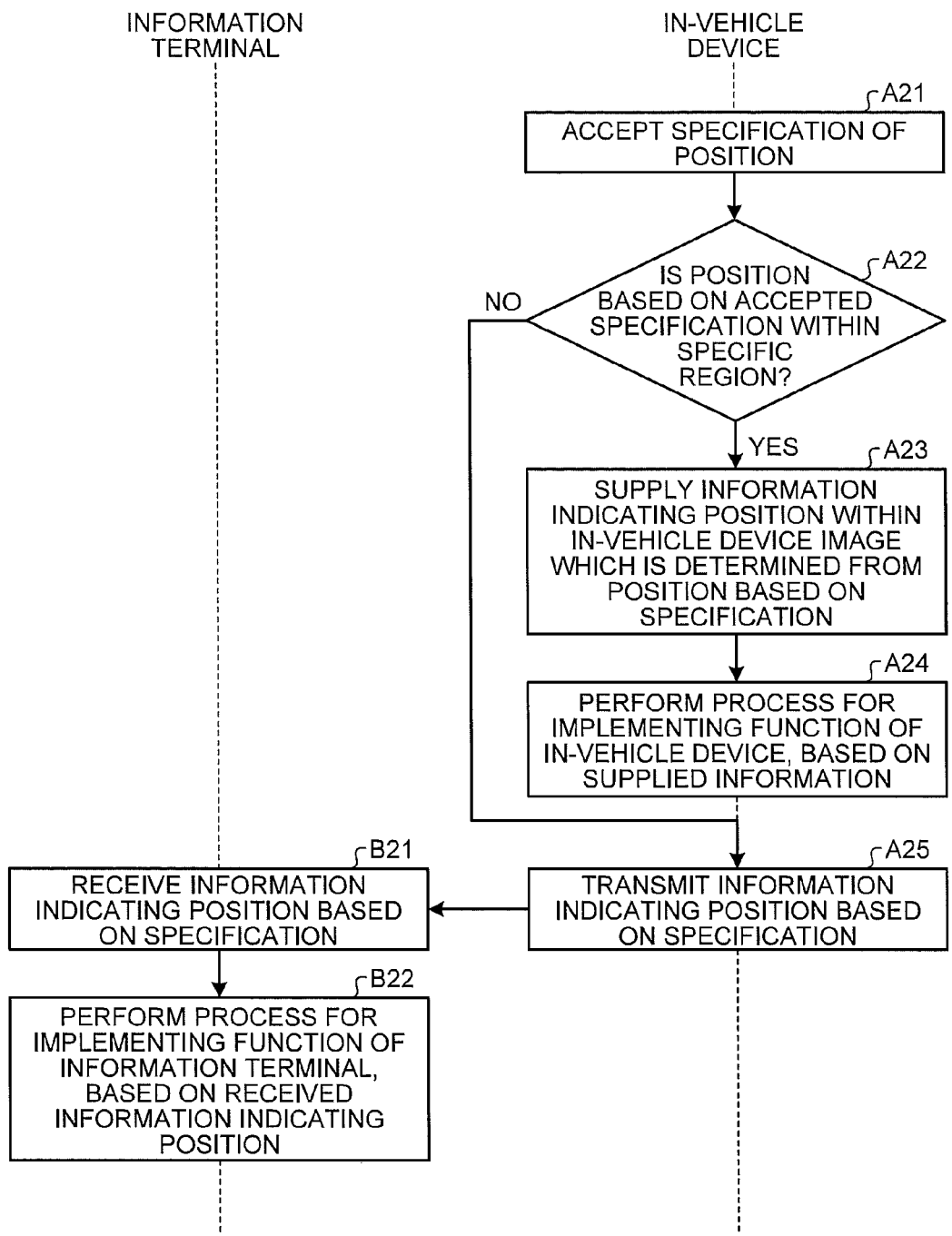

FIG.12A

| FUNCTION | UPPER-LEFT COORDINATES | LOWER-RIGHT COORDINATES |
|---|---|---|
| RADIO | (40, 40) | (280, 440) |
| CD | (0, 0) | (480, 520) |

FIG.12B

| FUNCTION | COLOR (RGB) |
|---|---|
| RADIO | (0, 0, 255) |
| CD | (0, 255, 0) |

FIG.12C

| FUNCTION | RADIUS |
|---|---|
| RADIO | 120 |
| CD | 220 |

INFORMATION DEVICE, IMAGE COMBINING METHOD, AND COMPUTER-READABLE RECORDING MEDIUM

CROSS-REFERENCE TO RELATED APPLICATION(S)

This application is a continuation of International Application No. PCT/JP2013/068687, filed on Jul. 8, 2013 which claims the benefit of priority of the prior Japanese Patent Application No. 2012-179026, filed on Aug. 10, 2012, the entire contents of which are incorporated herein by reference.

BACKGROUND OF THE INVENTION

1. Field of the Invention

The present invention relates to an information device, an image combining method, and a computer-readable recording medium.

2. Description of the Related Art

An invention is known in which by connecting an information terminal such as a smartphone to an in-vehicle device such as an in-vehicle monitor by wireless communication, etc., the information terminal and the in-vehicle device are allowed to cooperate with each other. For example, Japanese Patent Application Laid-open No. 2010-130553 discloses an invention in which an image received from a portable terminal and an image (operation screen) related to the operations of an in-vehicle device are combined together and displayed on a touch panel provided to the in-vehicle device.

In the invention disclosed in Japanese Patent Application Laid-open No. 2010-130553, the in-vehicle device determines in what positional relationship the image received from the portable terminal and the image related to the operations of the in-vehicle device are combined together, based on the size of the image received from the portable terminal, the size of the image related to the operations of the in-vehicle device, etc.

However, in the invention disclosed in Japanese Patent Application Laid-open No. 2010-130553, the in-vehicle device determines the positional relationship without considering which part of the image received from the portable terminal is an important region to a user. For this reason, in the invention disclosed in Japanese Patent Application Laid-open No. 2010-130553, a region (important region) where information important to the user is presented within the image received from the portable terminal may be hidden by the image related to the operations of the in-vehicle device. Hence, there is a demand of combining and displaying the image received from the portable terminal and the image related to the operations of the in-vehicle device such that the important region within the image received from the portable terminal is not hidden.

SUMMARY OF THE INVENTION

It is an object of the present invention to at least partially solve the problems in the conventional technology.

There is provided an information device that includes an image receiving unit that receives an information terminal image having a specific region from an information terminal, the specific region being composed of pixels having a same feature value, the feature value being luminance or chromaticity; a specific region detecting unit that detects the specific region within the information terminal image, based on feature values of pixels composing the information terminal image received by the image receiving unit; an information device image creating unit that creates an information device image related to a function provided to the information device; a composite image creating unit that creates a composite image where the information device image created by the information device image creating unit is embedded in the specific region within the information terminal image, the specific region being detected by the specific region detecting unit; and a display control unit that displays the composite image created by the composite image creating unit on a display apparatus.

There is also provided an image combining method that includes an image receiving step of receiving from an information terminal an information terminal image having a specific region composed of pixels having a same feature value, the feature value being luminance or chromaticity; a specific region detecting step of detecting the specific region within the information terminal image, based on feature values of pixels composing the information terminal image received at the image receiving step; an information device image creating step of creating an information device image related to a function provided to an information device; a composite image creating step of creating a composite image where the information device image created at the information device image creating step is embedded in the specific region within the information terminal image, the specific region being detected at the specific region detecting step; and a display control step of displaying the composite image created at the composite image creating step on a display apparatus.

There is further provided a computer-readable recording medium that stores therein a computer program for causing a computer to perform an image combining method, the method includes an image receiving step of receiving from an information terminal an information terminal image having a specific region composed of pixels having a same feature value, the feature value being luminance or chromaticity; a specific region detecting step of detecting the specific region within the information terminal image, based on feature values of pixels composing the information terminal image received at the image receiving step; an information device image creating step of creating an information device image related to a function provided to an information device; a composite image creating step of creating a composite image where the information device image created at the information device image creating step is embedded in the specific region within the information terminal image, the specific region being detected at the specific region detecting step; and a display control step of displaying the composite image created at the composite image creating step on a display apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating size specification information specifying the size of a specific region;

FIG. 7 is a sequence diagram illustrating a post-combining touch process according to the first embodiment of the present invention;

FIG. 12A is a diagram illustrating size specification information specifying the size and position of a specific region. FIG. 12B is a diagram illustrating color specification information specifying a color of pixels composing the specific region. FIG. 12C is a diagram illustrating size specification information specifying the size of the specific region by the radius of the specific region.

DETAILED DESCRIPTION OF THE PREFERRED EMBODIMENTS

An in-vehicle information system 100 according to an embodiment of the present invention where an in-vehicle device is applied as an information device will be described below with reference to the drawings.

First Embodiment

Figure 1:
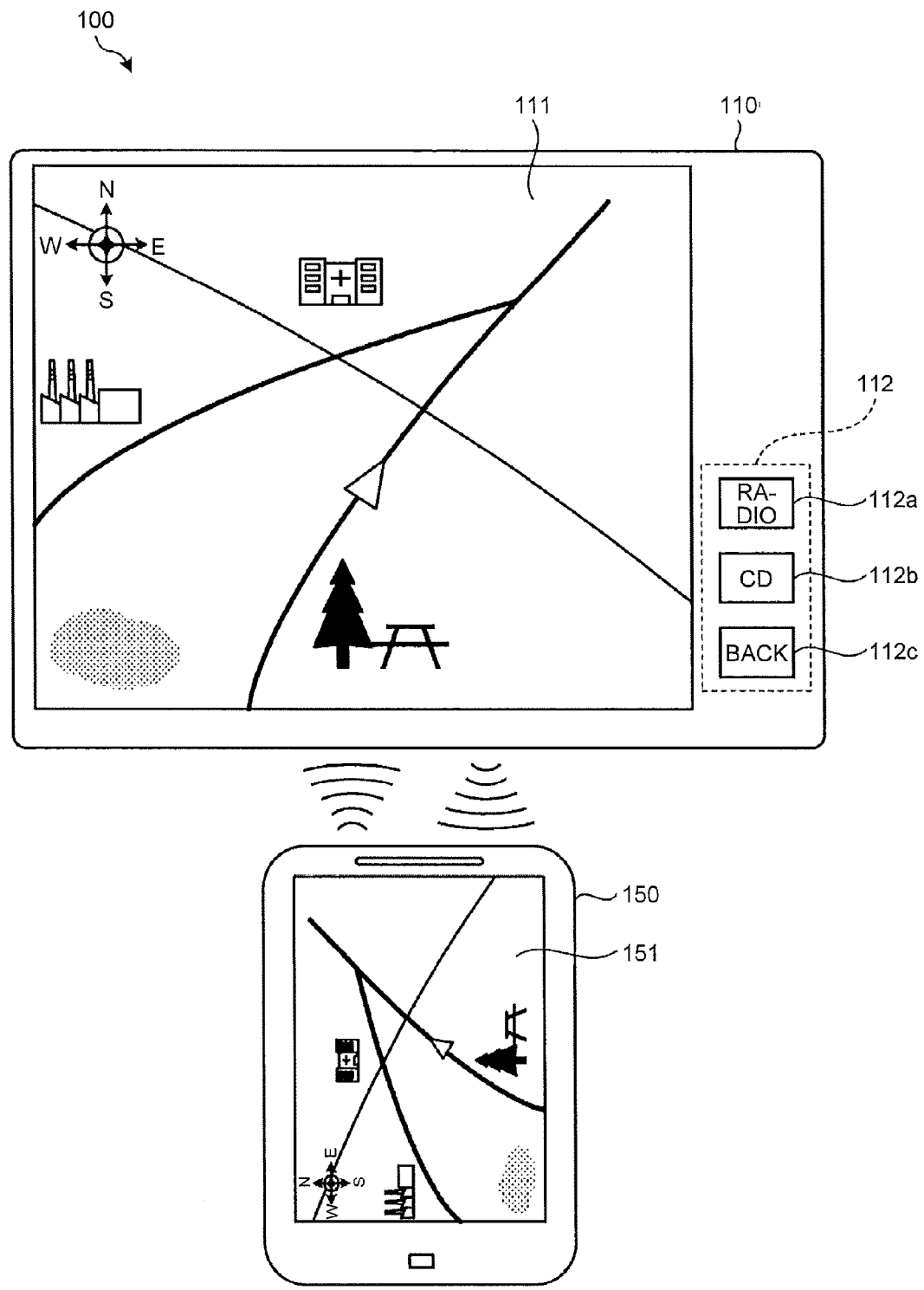
FIG. 1 is a diagram illustrating an external appearance of an in-vehicle information system according to a first embodiment of the present invention.

As illustrated in an external view of FIG. 1, an in-vehicle information system 100 according to a first embodiment is a system configured by an in-vehicle device 110 and an information terminal 150 which are connected to each other by wireless communication. In the present invention, the in-vehicle device 110 and the information terminal 150 may be connected to each other by wired communication.

As illustrated in the drawing, the in-vehicle information system 100 can display an image related to a function provided to the information terminal 150, on a touch panel 111 provided to the in-vehicle device 110. Here, the image related to a function provided to the information terminal 150 is, for example, an image created by the information terminal 150 executing an application program. That is, the image is an image of a GUI (Graphical User Interface) provided by application software executed by the information terminal 150. In addition, in the in-vehicle information system 100, a user can provide an instruction to the application software executed by the information terminal 150, by operating the touch panel 111 provided to the in-vehicle device 110.

The in-vehicle device 110 is a device composed of an in-vehicle monitor, etc. In addition, as illustrated in the drawing, the in-vehicle device 110 includes the touch panel 111 and function buttons 112 (112a, 112b, and 112c).

The touch panel 111 includes a display apparatus (a liquid crystal display, an organic EL (Electro Luminescence) display, etc.) and an input apparatus (a digitizer, etc.).

The function buttons 112 are buttons composed of hardware keys and accepting specification of a desired function among a plurality of functions (application software) provided to the in-vehicle device 110. On the other hand, the in-vehicle device 110 performs the specified function and displays an image related to the function being performed on the touch panel 111. As illustrated in the drawing, the function buttons 112 include a radio button 112a, a CD (Compact Disc) button 112b, and a back button 112c.

The radio button 112a is a button that accepts an instruction to allow the in-vehicle device 110 to execute a radio function program 114a which will be described later.

The CD button 112b is a button that accepts an instruction to allow the in-vehicle device 110 to execute a CD function program 114b which will be described later.

The back button 112c is a button that accepts an instruction to allow the in-vehicle device 110 to terminate an application program currently being executed by the in-vehicle device 110.

Figure 2:
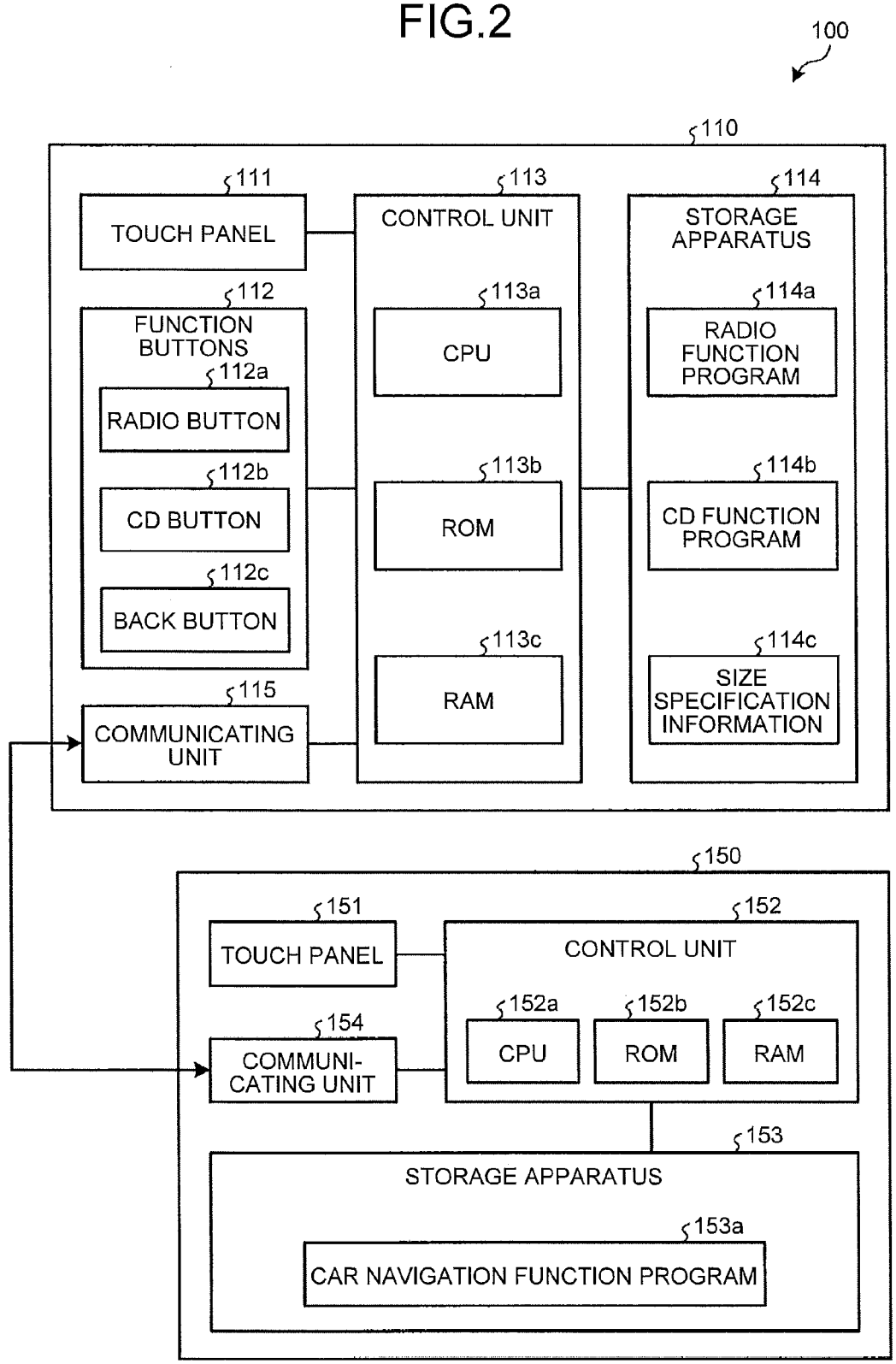
FIG. 2 is a diagram illustrating a configuration of the in-vehicle information system according to the first embodiment of the present invention.

In addition, as illustrated in a configuration diagram of FIG. 2, the in-vehicle device 110 includes a control unit 113, a storage apparatus 114, and a communicating unit 115, in addition to the above-described touch panel 111 and function buttons 112. The touch panel 111, the function buttons 112, the storage apparatus 114, and the communicating unit 115 are connected to the control unit 113 via a bus, etc.

The control unit 113 includes a CPU (Central Processing Unit) 113a, a ROM (Read Only Memory) 113b, a RAM (Random Access Memory) 113c, etc., and controls the operation of each unit included in the in-vehicle device 110.

The ROM 113b stores therein programs such as a specific region detecting program, an in-vehicle device image creating program, a composite image creating program, a display control program, a process performing program, a position specification accepting program, a position determining program, and a position information supplying program. These programs are programs executed by the CPU 113a so that the control unit 113 can implement each function which will be described later.

The RAM 113c is a working area used by the CPU 113a to execute various types of programs stored in the ROM 113b.

The storage apparatus 114 is composed of a flash memory, etc. The storage apparatus 114 stores therein the radio function program 114a, the CD function program 114b, a size specification information 114c, etc.

The radio function program 114a is an application program for receiving and reproducing a radio broadcasting. In addition, the radio function program 114a is an application program executed by the control unit 113.

The CD function program 114b is an application program for reproducing CDs. In addition, the CD function program 114b is an application program executed by the control unit 113.

The size specification information 114c is information to be transmitted from the in-vehicle device 110 to the information terminal 150. In addition, the size specification information 114c is information specifying the size of a specific region 111a provided within an image related to a car navigation function program 153a executed by the information terminal 150. The specific region 111a is a region composed of pixels having the same color. Note that the color of the pixels composing the region is represented by a feature value which is luminance or chromaticity.

Figure 3:
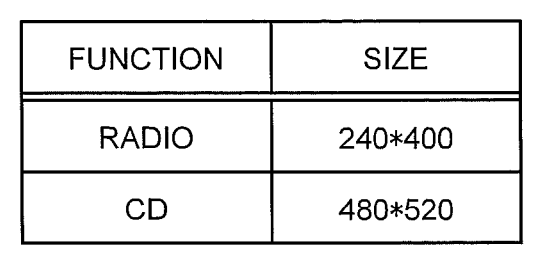

In addition, as illustrated in FIG. 3, the size specification information 114c is information indicating the size of the specific region 111a. The size specification information 114c is information prepared for each function provided to the in-vehicle device 110. That is, the size of the specific region 111a is predetermined for each function.

The communicating unit 115 is a device composed of a modulator-demodulator circuit, an antenna, etc., and performing transmission and reception of data with a communicating unit 154 of the information terminal 150 which will be described later, by wireless communication.

Figure 4A:
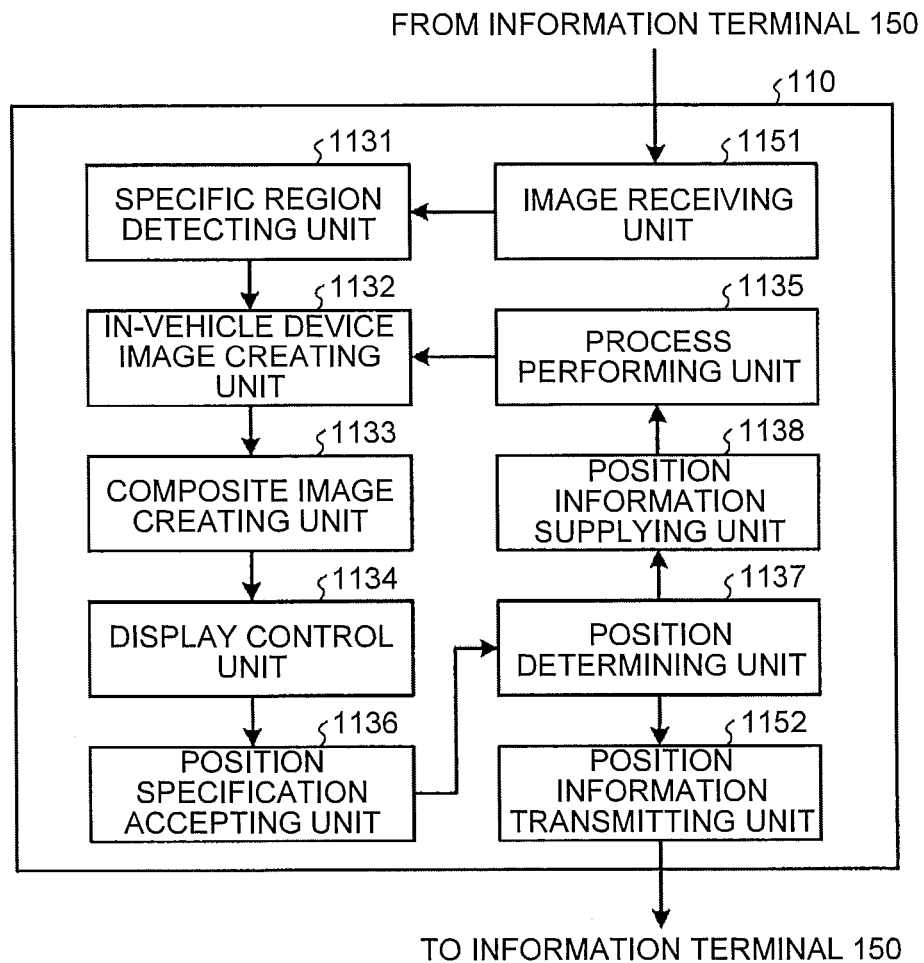
FIG. 4(A) is a functional block diagram of an in-vehicle device according to the first embodiment of the present invention.

In addition, as illustrated in a functional block diagram of FIG. 4(A), the in-vehicle device 110 includes a specific region detecting unit 1131, an in-vehicle device image creating unit 1132, a composite image creating unit 1133, a display control unit 1134, a process performing unit 1135, a position specification accepting unit 1136, a position determining unit 1137, a position information supplying unit 1138, an image receiving unit 1151, and a position information transmitting unit 1152.

The specific region detecting unit 1131, the in-vehicle device image creating unit 1132, the composite image creating unit 1133, the display control unit 1134, the process performing unit 1135, the position specification accepting unit 1136, the position determining unit 1137, and the position information supplying unit 1138 are implemented by executing, by the CPU 113a included in the control unit 113, the specific region detecting program, the in-vehicle device image creating program, the composite image creating program, the display control program, the process performing program, the position specification accepting program, the position determining program, and the position information supplying program which are stored in the ROM 113b.

The image receiving unit 1151 and the position information transmitting unit 1152 are implemented by the communicating unit 115.

Note that the details of the above-described functions will be described later using a sequence diagram.

As illustrated in FIG. 2, the information terminal 150 includes a touch panel 151, a control unit 152, a storage apparatus 153, and the communicating unit 154. The touch panel 151, the storage apparatus 153, and the communicating unit 154 are connected to the control unit 152 via a bus, etc. The information terminal 150 is, for example, a mobile phone such as a smartphone.

The touch panel 151 is composed of a display apparatus (a liquid crystal display, an organic EL (Electro Luminescence) display, etc.) and an input apparatus (a digitizer, etc.).

The control unit 152 includes a CPU 152a, a ROM 152b, a RAM 152c, etc., and controls the operation of each unit included in the information terminal 150.

The ROM 152b stores therein an information terminal image creating program, a process performing program, etc. The information terminal image creating program and the process performing program are programs for allowing the control unit 152 to function as an information terminal image creating unit 1521 and a process performing unit 1522 which will be described later, and are executed by the CPU 152a.

The RAM 152c is a working area used by the CPU 152a to execute various types of programs stored in the ROM 152b.

The storage apparatus 153 is composed of a flash memory, etc. The storage apparatus 153 includes the car navigation function program 153a.

The car navigation function program 153a is a type of application program executed by the control unit 152, and is an application program for implementing a car navigation function.

The communicating unit 154 is a device composed of a modulator-demodulator circuit, an antenna, etc., and performing transmission and reception of data with the in-vehicle device 110 by wireless communication.

Figure 4B:
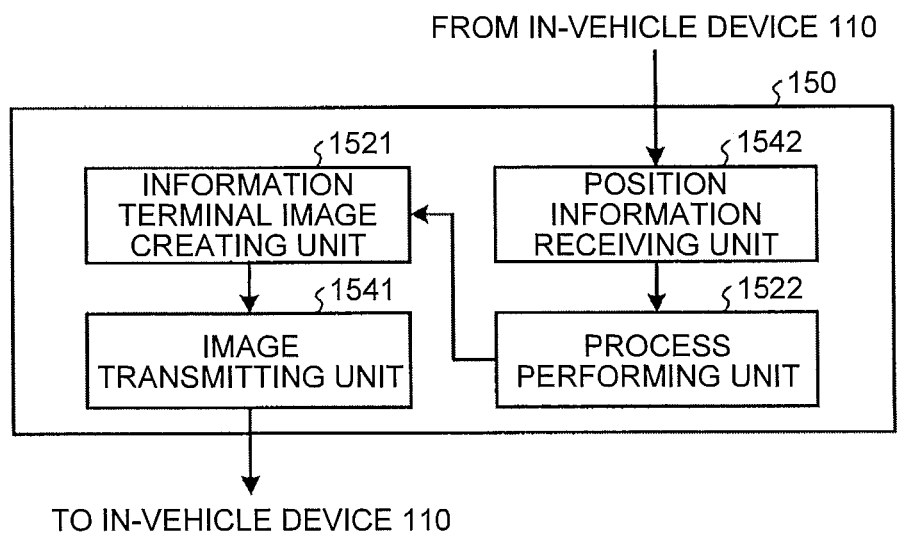
FIG. 4(B) is a functional block diagram of an information terminal according to the first embodiment of the present invention.

In addition, as illustrated in a functional block diagram of FIG. 4(B), the information terminal 150 includes the information terminal image creating unit 1521, the process performing unit 1522, an image transmitting unit 1541, and a position information receiving unit 1542.

The information terminal image creating unit 1521 and the process performing unit 1522 are implemented by the CPU 152a executing the information terminal image creating program and the process performing program which are stored in the ROM 152b.

The image transmitting unit 1541 and the position information receiving unit 1542 are implemented by the communicating unit 154.

Note that the details of the information terminal image creating unit 1521, the process performing unit 1522, the image transmitting unit 1541, and the position information receiving unit 1542 will be described later using a sequence diagram.

Next, the operation of the in-vehicle information system 100 having the above-described configuration will be described. It is premised that, as illustrated in FIG. 1, the information terminal 150 and the in-vehicle device 110 are connected to each other and an image related to an application program executed by the information terminal 150 is displayed on the touch panel 111 of the in-vehicle device 110.

Figure 5:
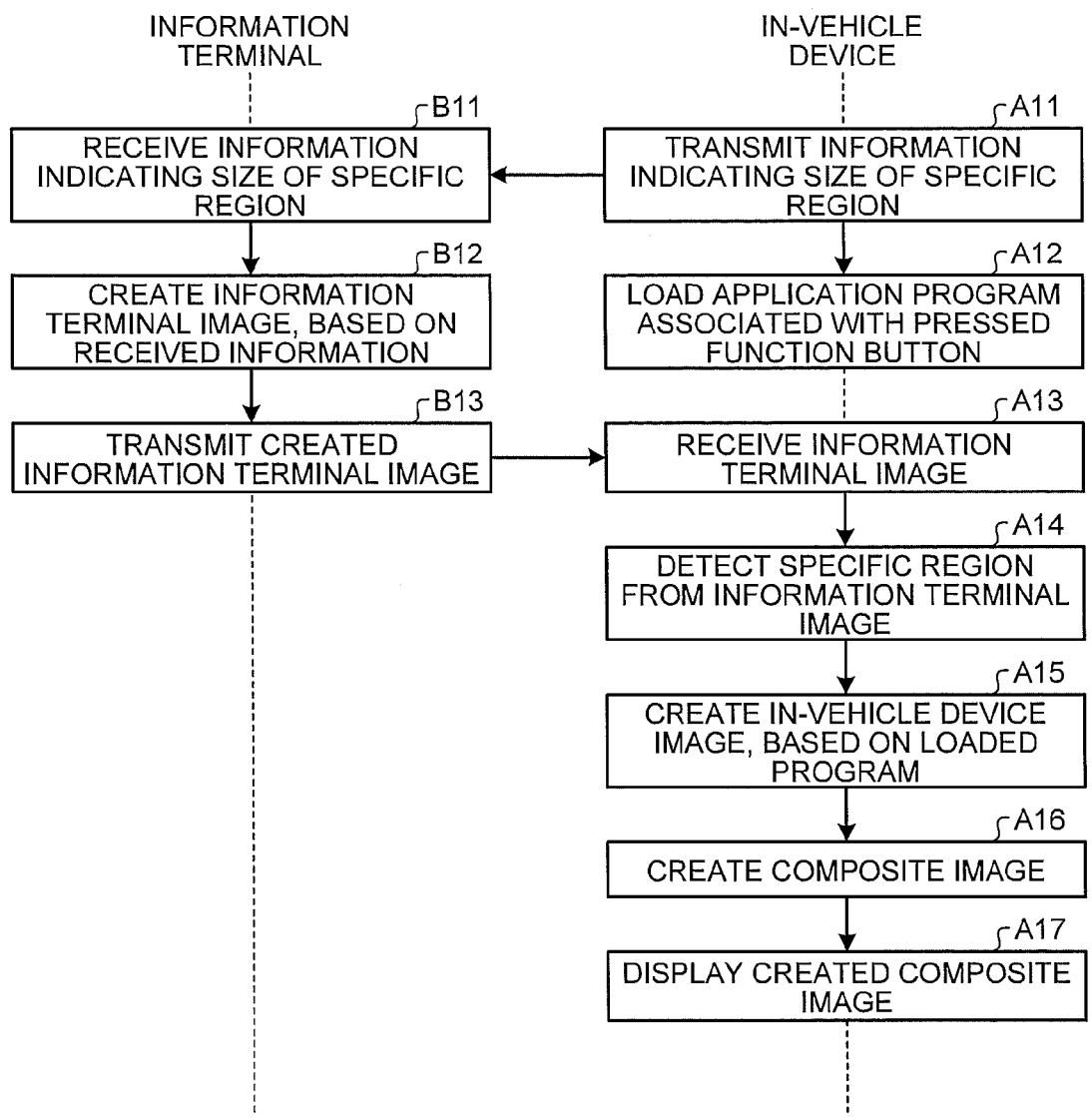
FIG. 5 is a sequence diagram illustrating an image combining process according to the first embodiment of the present invention.

First, a process (image combining process) of the in-vehicle information system 100 where, when a function button 112 is pressed by the user, an image related to an application program associated with the pressed function button 112 is displayed on the touch panel 111 will be described with reference to a sequence diagram illustrated in FIG. 5.

Image Combining Process

A description will be made below assuming that a function button 112 pressed by the user is the radio button 112a. First, the control unit 113 refers to the size specification information 114c and transmits information indicating the "size (240*400)" of a specific region 111a which is associated with the "function (radio)" of the pressed function button 112 (radio button 112a), to the information terminal 150 through the communicating unit 115 (step A11).

Subsequently, the control unit 113 (in-vehicle device image creating unit 1132) loads an application program (radio function program 114a) associated with the pressed function button 112 (radio button 112a) (step A12).

On the other hand, the information terminal 150 receives the information indicating the "size (240*400)" of the specific region 111a through the communicating unit 154 (step B11).

Then, the control unit 152 (information terminal image creating unit 1521) creates an information terminal image 111b, based on the received information (step B12).

The information terminal image 111b is an image having the specific region 111a and related to the car navigation function program 153a. Here, it is assumed that the specific region 111a is composed of pixels having a color represented by RGB (0, 0, 255). That is, the control unit 152 (information terminal image creating unit 1521) creates the information terminal image 111b by setting the color of the pixels composing the specific region 111*a* among the pixels composing the above-described image to RGB (0, 0, 255).

The control unit 152 (information terminal image creating unit 1521) can provide the specific region 111*a* at any position within the image related to the car navigation function program 153*a*. The control unit 152 (information terminal image creating unit 1521) provides the specific region 111*a*, for example, in a region with a low level of importance (e.g., a sea or mountain where there are no roads) within the image related to the car navigation function program 153*a*.

Figure 6A:
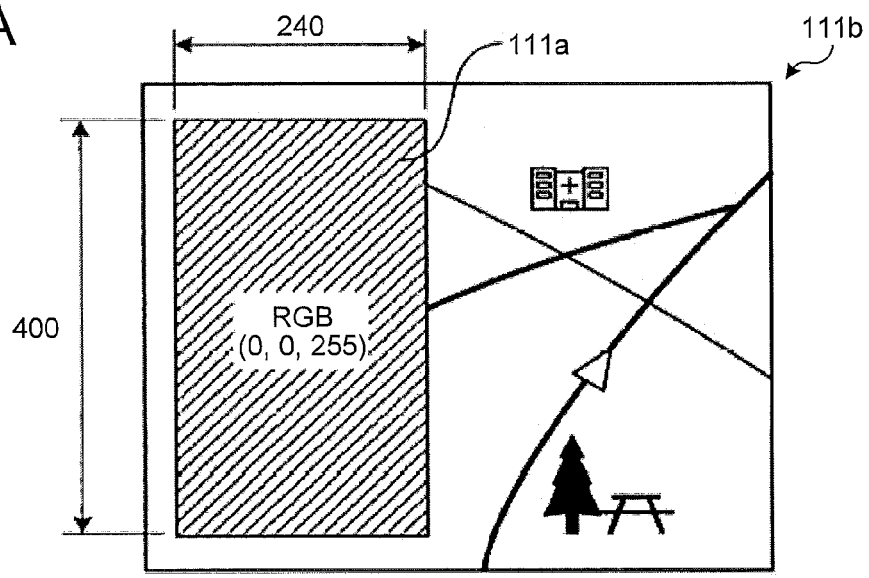
FIG. 6A is a diagram illustrating a specific example of an information terminal image.

In this manner, as illustrated in FIG. 6A, the control unit 152 (information terminal image creating unit 1521) creates the information terminal image 111*b*, based on the received information (the information indicating that the size of the specific region 111*a* is 240*400). Note that a hatched portion illustrated in the drawing is the specific region 111*a* composed of pixels having the color represented by RGB (0, 0, 255).

Subsequently, the control unit 152 transmits the information terminal image 111*b* to the in-vehicle device 110 through the communicating unit 154 (image transmitting unit 1541) (step B13).

The in-vehicle device 110 receives the information terminal image 111*b* through the communicating unit 115 (image receiving unit 1151) (step A13).

Then, the control unit 113 (specific region detecting unit 1131) detects the specific region 111*a* included in the received information terminal image 111*b* (step A14).

Specifically, the control unit 113 (specific region detecting unit 1131) detects a region where a predetermined number (e.g., 100*100) or more of pixels having the same color are continuously arranged vertically and horizontally, and identifies the detected region as the specific region 111*a*. In the example illustrated in FIG. 6A, the specific region detecting unit 1131 detects, as the specific region 111*a*, a region (the hatched portion illustrated in the drawing) where a predetermined number (240*400) or more of pixels having the same color (RGB (0, 0, 255)) are continuously arranged vertically and horizontally.

Figure 6B:
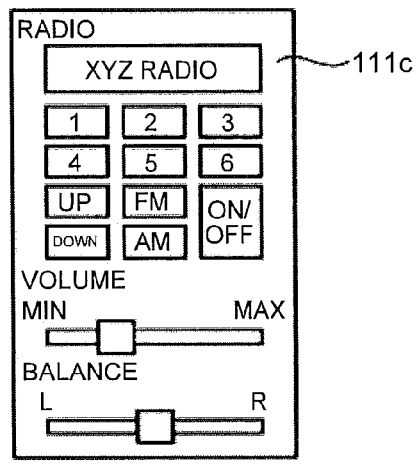
FIG. 6B is a diagram illustrating a specific example of an in-vehicle device image.

Subsequently, the in-vehicle device image creating unit 1132 creates an in-vehicle device image 111*c*, based on the application program (radio function program 114*a*) loaded at step A12 (step A15). The in-vehicle device image 111*c* is an image related to the application program loaded by the in-vehicle device image creating unit 1132, as illustrated in FIG. 6B.

Then, the composite image creating unit 1133 creates a composite image 111*d* (step A16). The composite image 111*d* is an image where the in-vehicle device image 111*c* created at step A15 is embedded in the specific region 111*a* of the received information terminal image 111*b*, such as that illustrated in FIG. 6C.

Finally, the display control unit 1134 displays the created composite image 111*d* on the touch panel 111 (step A17).

In this manner, the information terminal image 111*b* and the in-vehicle device image 111*c* are combined together.

Figure 6C:
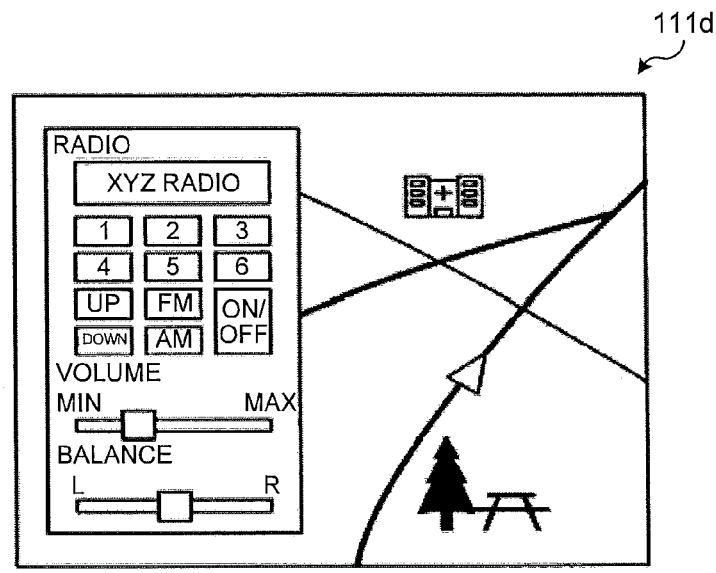
FIG. 6C is a diagram illustrating a specific example of a composite image.

Next, a process (post-combining touch process) of the in-vehicle information system 100 which is performed when the user performs a touch operation with the composite image 111*d* as exemplified in FIG. 6C being displayed on the touch panel 111 will be described with reference to a sequence diagram illustrated in FIG. 7.

Post-Combining Touch Process

First, the control unit 113 (position specification accepting unit 1136) accepts specification of a position (touch operation) by the user (step A21). The position specified is represented by, for example, coordinates (X-coordinate and Y-coordinate) on the touch panel 111.

Subsequently, the control unit 113 (position determining unit 1137) determines whether the position (touch position) based on the specification accepted by the control unit 113 (position specification accepting unit 1136) belongs to the specific region 111*a* (whether the position belongs to the specific region 111*a* or other region) (step A22).

If the control unit 113 (position determining unit 1137) determines that the position based on the specification accepted by the control unit 113 (position specification accepting unit 1136) belongs to the specific region 111*a* (step A22: YES), the control unit 113 (position information supplying unit 1138) supplies information indicating a position within the in-vehicle device image 111*c* which is determined from the position based on the specification, to the control unit 113 (process performing unit 1135) (step A23).

Note that the position based on the specification is a position within the composite image 111*d*, and the position to be supplied to the control unit 113 (process performing unit 1135) is a relative position within the in-vehicle device image 111*c*. Therefore, the control unit 113 (position information supplying unit 1138) can determine the position to be supplied to the control unit 113 (process performing unit 1135), based on the compression rate or magnification rate used when the in-vehicle device image 111*c* is embedded in the information terminal image 111*b*, and the position of the specific region 111*a* within the composite image 111*d*.

Then, the control unit 113 (process performing unit 1135) performs a process for implementing a function (radio function) provided to the in-vehicle device 110, based on the information supplied from the control unit 113 (position information supplying unit 1138) (step A24).

On the other hand, if the control unit 113 (position determining unit 1137) determines that the position based on the specification accepted by the control unit 113 (position specification accepting unit 1136) belongs to other region (a region other than the specific region 111*a*) (step A22: NO), the communicating unit 115 (position information transmitting unit 1152) transmits information indicating the position based on the specification to the information terminal 150 (step A25).

The information terminal 150 receives the information indicating the position based on the specification through the communicating unit 154 (position information receiving unit 1542) (step B21).

Then, the control unit 152 (process performing unit 1522) performs a process for implementing a function provided to the information terminal 150 (performs the car navigation function program 153*a*), based on the received information (step B22).

In this manner, the in-vehicle information system 100 accepts a user's touch operation and performs a process according to the touch operation.

As described above, according to the in-vehicle information system 100 according to the first embodiment, an image related to a function of the information terminal 150 and an image related to a function of the in-vehicle device 110 can be combined together and displayed on the touch panel 111 of the in-vehicle device 110 such that an important region is not hidden. In addition, according to the in-vehicle information system 100 according to the first embodiment, the user can perform a touch operation on the in-vehicle device 110 and the information terminal 150 by referring to the composite image 111*d* displayed on the touch panel 111 provided to the in-vehicle device 110.

Second Embodiment

An in-vehicle information system 200 according to a second embodiment is configured such that, when a drag operation crossing a boundary between a specific region 111a and other region is performed on a touch panel 111, an in-vehicle device 210 or an information terminal 150 is restrained from performing an inappropriate process. The in-vehicle information system 200 differs from the in-vehicle information system 100 in this regard.

In addition, when the in-vehicle information system 200 detects the drag operation crossing the boundary, the in-vehicle information system 200 ignores a touch operation performed in a region where the starting point of the drag operation does not belong, during a period until the drag operation is completed. Specifically, the in-vehicle information system 200 is configured, for example, not to transmit information indicating a position specified by the touch operation to the information terminal 150 during a period from when detecting that the user performs a drag operation crossing a boundary between a region (specific region 111a) allocated to the in-vehicle device 210 and a region (a region other than the specific region 111a) allocated to the information terminal 150 from the region (specific region 111a) allocated to the in-vehicle device 210 until detecting that the drag operation is completed.

Hence, even if the user mistakenly operates the region (the region other than the specific region 111a) allocated to the information terminal 150 while performing a drag operation in the region (specific region 111a) allocated to the in-vehicle device 210, erroneous operation of the information terminal 150 can be prevented.

The in-vehicle information system 200 having such a configuration will be described below. Note that the same components as those of the in-vehicle information system 100 according to the first embodiment are denoted by the same reference characters and a description thereof is omitted as appropriate. Note that the in-vehicle information system 200 according to the second embodiment is the same as the in-vehicle information system 100 according to the first embodiment in terms of its external appearance and configuration (FIGS. 1 and 2). On the other hand, the in-vehicle information system 200 differs from the in-vehicle information system 100 in programs stored in a ROM.

The in-vehicle information system 200 includes the in-vehicle device 210 and the information terminal 150.

As with the in-vehicle device 110, the in-vehicle device 210 includes a touch panel 111, function buttons 112, a control unit 113, a storage apparatus 114, and a communicating unit 115. The touch panel 111, the function buttons 112, the storage apparatus 114, and the communicating unit 115 are connected to the control unit 113.

The control unit 113 includes a CPU 113a, a ROM 113b, a RAM 113c, etc., and controls the operation of each unit included in the in-vehicle device 210.

The ROM 113b stores therein a drag operation detecting program, etc. The drag operation detecting program is a program for allowing the control unit 113 to function as a drag operation detecting unit 2131 which will be described later, and is executed by the CPU 113a.

The RAM 113c is a working area used by the CPU 113a to execute various types of programs stored in the ROM 113b.

Figure 8:
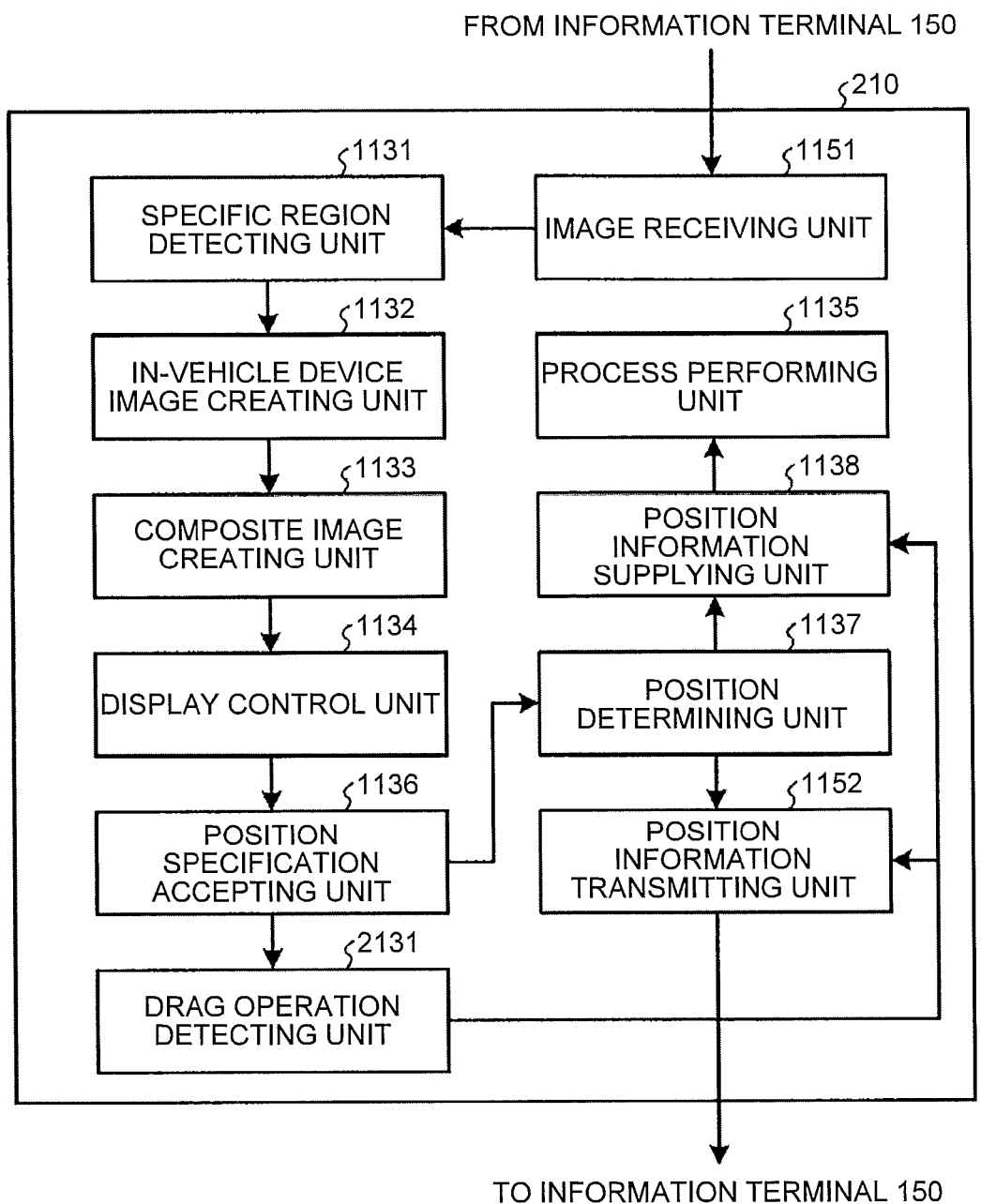
FIG. 8 is a functional block diagram of an in-vehicle device according to a second embodiment of the present invention.

In addition, as illustrated in a functional block diagram of FIG. 8, the in-vehicle device 210 includes a specific region detecting unit 1131, an in-vehicle device image creating unit 1132, a composite image creating unit 1133, a display control unit 1134, a process performing unit 1135, a position specification accepting unit 1136, a position determining unit 1137, a position information supplying unit 1138, the drag operation detecting unit 2131, an image receiving unit 1151, and a position information transmitting unit 1152.

The drag operation detecting unit 2131 is implemented by the CPU 113a executing the drag operation detecting program stored in the ROM 113b. Note that the details of the drag operation detecting unit 2131 will be described later using a sequence diagram.

Figure 9:
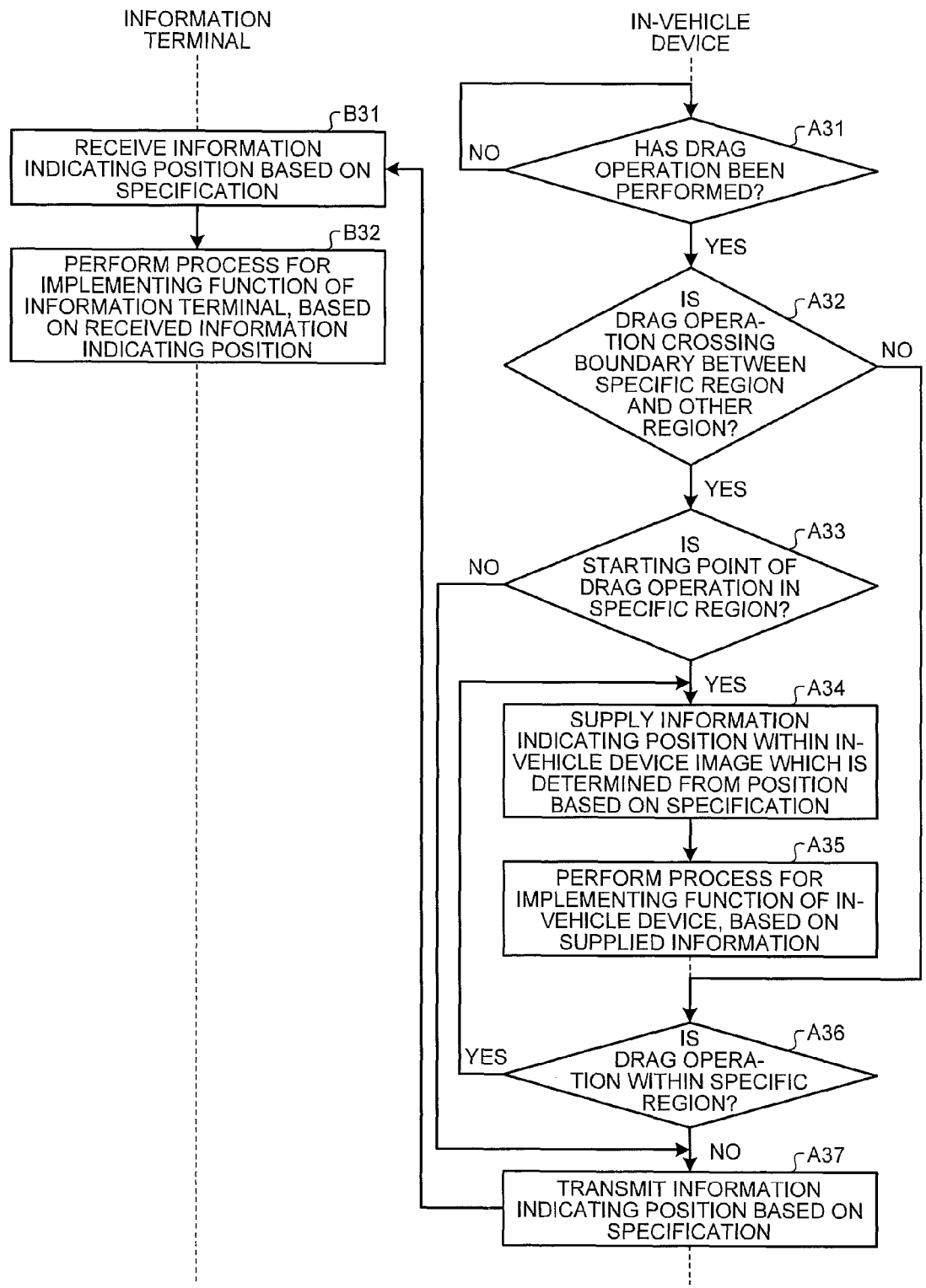
FIG. 9 is a sequence diagram illustrating a drag operation process according to the second embodiment of the present invention.

A drag operation process (the process of detecting a drag operation and a process according to the drag operation) of the in-vehicle information system 200 having the above-described configuration will be described below with reference to a sequence diagram illustrated in FIG. 9. It is premised that a composite image 111d such as that exemplified in FIG. 6C is displayed on the touch panel 111.

Drag Operation Process

First, the control unit 113 (drag operation detecting unit 2131) determines whether a drag operation has been performed, based on specification accepted by the control unit 113 (position specification accepting unit 1136) (step A31).

Specifically, for example, when the control unit 113 (position specification accepting unit 1136) accepts continuous position specification, the control unit 113 (drag operation detecting unit 2131) detects an operation related to the specification as a drag operation.

Subsequently, if the control unit 113 (drag operation detecting unit 2131) has detected a drag operation (step A31: YES), the control unit 113 (drag operation detecting unit 2131) determines whether the detected drag operation is a drag operation crossing the boundary between the specific region 111a and other region (step A32). Note that if the control unit 113 (drag operation detecting unit 2131) determines that a drag operation has not been performed (step A31: NO), the control unit 113 (drag operation detecting unit 2131) repeats the operation at step A31 until determining that a drag operation has been performed.

If the control unit 113 (drag operation detecting unit 2131) determines that the detected drag operation is not a drag operation crossing the boundary between the specific region 111a and other region (step A32: NO), the control unit 113 (drag operation detecting unit 2131) determines whether the drag operation is a drag operation within the specific region 111a (whether the drag operation is a drag operation within the specific region 111a or a drag operation within other region) (step A36).

If the control unit 113 (drag operation detecting unit 2131) determines that the drag operation is a drag operation within the specific region 111a (step A36: YES), processing proceeds to step A34. On the other hand, if the control unit 113 (drag operation detecting unit 2131) determines that the drag operation is not a drag operation within the specific region 111a (the drag operation is a drag operation within other region) (step A36: NO), processing proceeds to step A37.

On the other hand, if the control unit 113 (drag operation detecting unit 2131) determines that the detected drag operation is a drag operation crossing the boundary between the specific region 111a and other region (step A32: YES), the control unit 113 (drag operation detecting unit 2131) determines whether the drag operation is a drag operation whose starting point is in the specific region 111a (step A33).

If the control unit 113 (drag operation detecting unit 2131) determines that the drag operation is a drag operation from the specific region 111a to other region (step A33: YES), the control unit 113 (position information supplying unit 1138) supplies information indicating a position within the in-vehicle device image 111c which is determined from the position based on the specification, to the control unit 113 (process performing unit 1135) (step A34).

The control unit 113 (process performing unit 1135) performs, based on the supplied information, a process for implementing a function (radio function) provided to the in-vehicle device 210 (step A35).

On the other hand, if the control unit 113 (drag operation detecting unit 2131) determines that the drag operation is not a drag operation whose starting point is in the specific region 111a (the drag operation is a drag operation whose starting point is in other region) (step A33: NO), the control unit 113 (position information supplying unit 1138) transmits information indicating the position based on the specification to the information terminal 150 (step A37).

The information terminal 150 receives the information indicating the position based on the specification through the communicating unit 154 (position information receiving unit 1542) (step B31).

Then, the control unit 152 (process performing unit 1522) performs, based on the received information, a process for implementing a function provided to the information terminal 150 (performs the car navigation function program 153a) (step B32).

In this manner, the in-vehicle information system 200 restrains from the occurrence of erroneous operation which is caused by a drag operation crossing the boundary between the specific region 111a and other region.

As described above, according to the in-vehicle information system 200 according to the second embodiment, the user can perform a drag operation on the in-vehicle device 210 and the information terminal 150 by referring to the composite image 111d displayed on the touch panel 111 provided to the in-vehicle device 210. Here, according to the in-vehicle information system 200 according to the second embodiment, when a drag operation crossing the boundary between the specific region 111a and other region is performed, an unexpected instruction can be prevented from being provided by the user to the in-vehicle information system 200.

In the above-described first embodiment, when it is determined that a touch position belongs to the specific region 111a (step A22: YES), the control unit 113 (position information supplying unit 1138) outputs information indicating the touch position to the control unit 113 (process performing unit 1135) (step A23).

In the present invention, when it is determined that a touch position belongs to the specific region 111a (step A22: YES), furthermore, the communicating unit 115 (position information transmitting unit 1152) may transmit information indicating the touch position to the communicating unit 154 (position information receiving unit 1542). In this case, the information terminal 150 may discard the received information indicating the touch position.

In the above-described first embodiment, when it is determined that a touch position belongs to a region other than the specific region 111a (step A22: NO), the communicating unit 115 (position information transmitting unit 1152) transmits information indicating the touch position to the communicating unit 154 (position information receiving unit 1542) (step A25).

In the present invention, when it is determined that a touch position belongs to a region other than the specific region 111a (step A22: NO), the information indicating the touch position may be discarded and the information indicating the touch position may not be transmitted to the communicating unit 154 (position information receiving unit 1542).

According to such a configuration, even if the user having pressed a function button 112 to use a function of the in-vehicle device 110 has mistakenly touched the information terminal image 111b, information indicating a touch position is not transmitted to the information terminal 150. Hence, an erroneous instruction can be prevented from being provided by the user to the information terminal 150.

In the above-described embodiments, the functions of the in-vehicle devices 110 and 210 are a radio function and a CD function, but are not limited thereto and any function can be applied.

In addition, the function of the information terminal 150 is a car navigation function, but is not limited thereto and any function can be applied.

For example, as a function of the in-vehicle devices 110 and 210, a camera function for photographing the rear of a vehicle having the in-vehicle device 110, 210 mounted thereon may be applied, and as a function of the information terminal 150, a CD function may be applied.

Figure 10A:
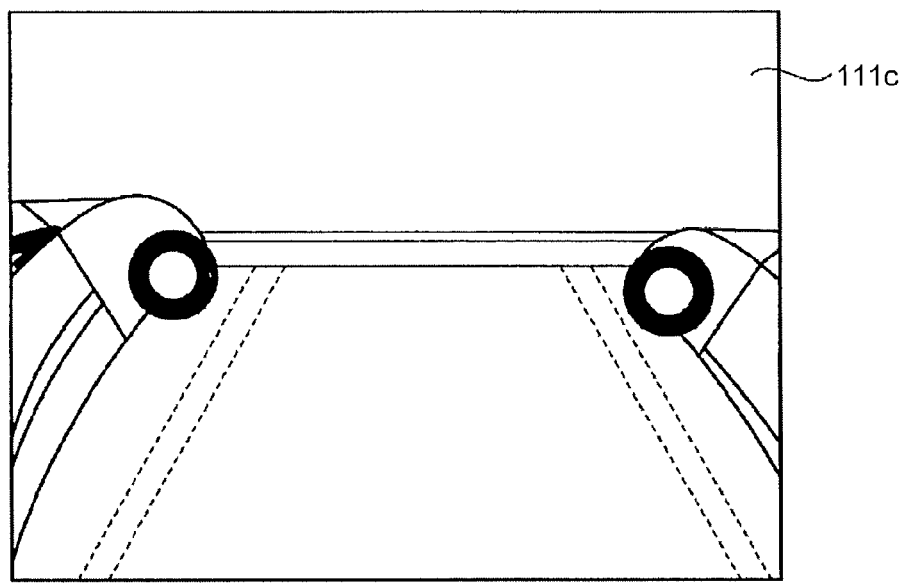
FIG. 10A is a diagram illustrating a variant of an in-vehicle device image.
Figure 10B:
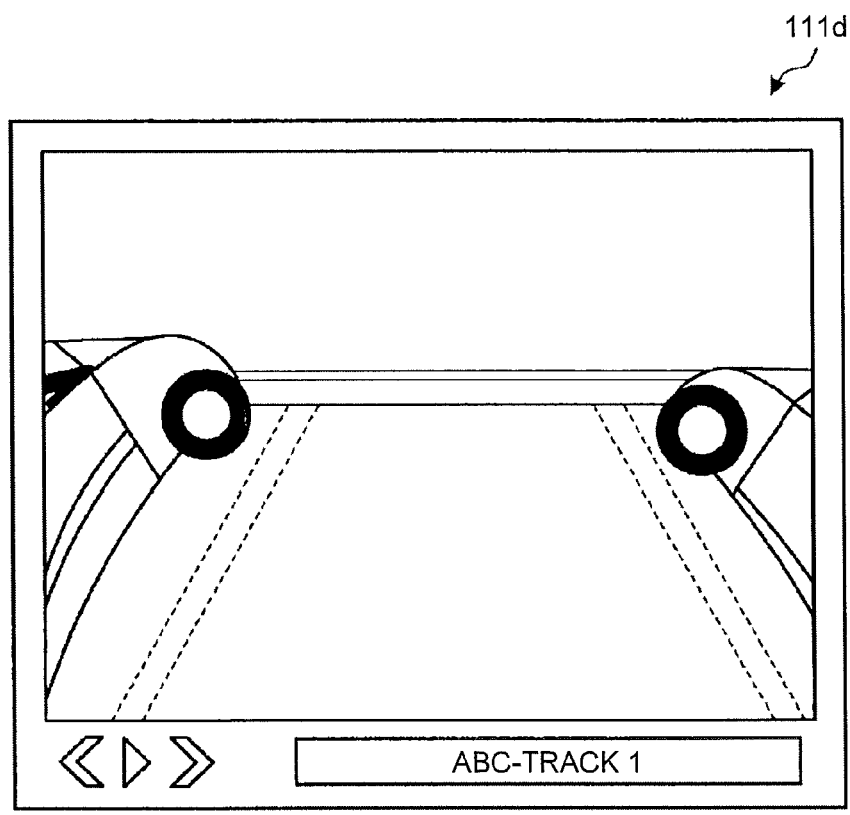
FIG. 10B is a diagram illustrating a variant of a composite image.

In this case, a specific region 111a may be set such that an in-vehicle device image (an image related to the camera function) 111c as illustrated in FIG. 10A occupies the most part of a composite image 111d, as illustrated in FIG. 10B.

In addition, the function buttons 112 of the in-vehicle devices 110 and 210 according to the above-described embodiments are composed of hardware keys, but may be composed of software keys.

Figure 11:
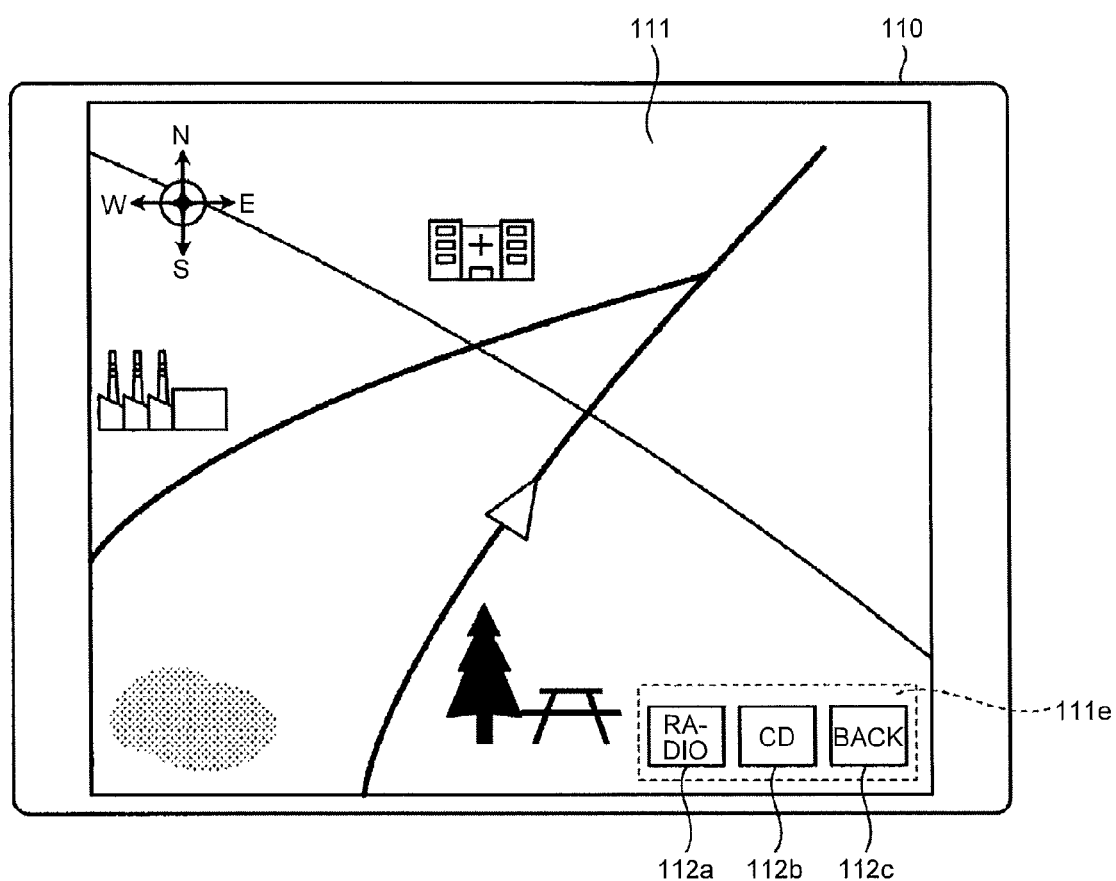
FIG. 11 is a diagram illustrating an example in which function buttons are composed of software keys.

In this case, as illustrated in FIG. 11, a region 111e where an image related to a function of the information terminal 150 is not displayed may be provided on the touch panel 111, and function buttons 112 composed of software keys may be arranged in the region 111e.

In addition, in the above-described embodiments, the size of the specific region 111a is defined by the numbers of vertical and horizontal pixels, but is not limited thereto. For example, the size of the specific region 111a may be defined by "upper-left coordinates" and "lower-right coordinates". In this case, for example, as illustrated in FIG. 12A, the size specification information 114c may be configured to include information indicating "upper-left coordinates" and "lower-right coordinates".

In addition, when, as illustrated in FIG. 12A, the size specification information 114c is configured to include information indicating "upper-left coordinates" and "lower-right coordinates", not only the size but also the position of the specific region 111a is defined. In this case, the information terminal 150 provides the specific region 111a at a position defined by "upper-left coordinates" and "lower-right coordinates".

In addition, in the above-described embodiments, the size of the specific region 111a is pre-defined by the size specification information 114c. In the present invention, as illustrated in FIG. 12B, a "color" (e.g., RGB) of pixels composing the specific region 111a may be further pre-defined by color specification information.

In the example illustrated in FIG. 12B, color information included in the color specification information has a single value, but is not limited thereto and may have values in a predetermined range (e.g., a range of ±10).

In addition, although in the above-described embodiments the control unit 152 (information terminal image creating unit 1521) generates a rectangular specific region 111a, the shape of the specific region 111a is not limited to a rectangle. The shape of the specific region 111a may be any, e.g., a polygon or a circle.

For example, when the control unit 152 (information terminal image creating unit 1521) is configured to generate a circular specific region 111a, as illustrated in FIG. 12C, the size specification information 114c may be configured to include information indicating the "radius" of the specific region 111a. In this case, the control unit 152 (information terminal image creating unit 1521) provides a specific region 111a having a size based on information indicating "radius" which is included in the size specification information 114c.

In addition, the functions of the in-vehicle information systems 100 and 200 may be implemented by a computer executing a program. The program for implementing the functions of the in-vehicle information systems 100 and 200 may be stored in a computer-readable recording medium such as a USB (Universal Serial Bus) memory, an SD memory card, a CD-ROM (Compact Disc Read Only Memory), a DVD (Digital Versatile Disc), a BD (Blue-ray Disc (registered trademark)), an HDD (Hard Disc Drive), or an SSD (Solid State Drive), or may be downloaded to a computer through a network.

According to the present invention, an information device, an image combining method, and a program can be provided that can combine and display an image received from the information terminal and an image related to a function of the information device such that an important region is not hidden.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information device comprising: a processor including,
    image receiving circuitry that receives an information terminal image having a specific region from an information terminal, the specific region being composed of pixels having a same feature value, the feature value being luminance or chromaticity;
    specific region detecting circuitry that detects the specific region within the information terminal image, based on feature values of pixels composing the information terminal image received by the image receiving circuitry;
    information device image creating circuitry that creates an information device image related to a function provided to the information device;
    composite image creating circuitry that creates a composite image where the information device image created by the information device image creating circuitry is embedded in the specific region within the information terminal image, the specific region being detected by the specific region detecting circuitry;
    display control circuitry that displays the composite image created by the composite image creating circuitry on a display apparatus;
    process performing circuitry that performs a process for implementing the function provided to the information device;
    position specification accepting circuitry that accepts a specification of a position within the composite image displayed by the display control circuitry;
    position determining circuitry that determines whether the position based on the specification accepted by position specification accepting circuitry belongs to the specific region or other region;
    position information supplying circuitry that supplies information indicating a position within the information device image to the process performing circuitry, when the position determining circuitry determines that the position based on the specification belongs to the specific region, the position within the information device image being determined from the position based on the specification; and
    first drag operation detecting circuitry that detects a first drag operation, based on the specification accepted by the position specification accepting circuitry, the first drag operation being a drag operation crossing a boundary between the specific region and the other region, and a starting point of the drag operation being in the other region, wherein
    the process performing circuitry performs the process for implementing the function, based on the information supplied from the position information supplying circuitry, and
    when the first drag operation detecting circuitry detects the first drag operation, the position information supplying circuitry does not supply information indicating a position within the information device image to the process performing circuitry until the first drag operation is no longer detected by the first drag operation detecting circuitry.

2. The information device according to claim 1, further comprising:
    position specification accepting circuitry that accepts a specification of a position within the composite image displayed by the display control circuitry;
    position determining circuitry that determines whether the position based on the specification accepted by the position specification accepting circuitry belongs to the specific region or other region; and
    position information transmitting circuitry that transmits information indicating the position based on the specification to the information terminal, when the position determining circuitry determines that the position based on the specification belongs to the other region.

3. The information device according to claim 2, further comprising a second drag operation detecting circuitry that detects a second drag operation, based on the specification accepted by the position specification accepting circuitry, the second drag operation being a drag operation crossing a boundary between the specific region and the other region, and a starting point of the second drag operation being in the specific region, wherein,
    when the second drag operation detecting circuitry detects the second drag operation, the position information transmitting circuitry does not transmit information indicating the position based on the specification to the information terminal until the second drag operation is no longer detected by the second drag operation detecting circuitry.

4. An image combining method comprising:
    an image receiving step of receiving from an information terminal an information terminal image having a specific region composed of pixels having a same feature value, the feature value being luminance or chromaticity;
    a specific region detecting step of detecting the specific region within the information terminal image, based on feature values of pixels composing the information terminal image received at the image receiving step;
    an information device image creating step of creating an information device image related to a function provided to an information device;
    a composite image creating step of creating a composite image where the information device image created at the information device image creating step is embedded in the specific region within the information terminal image, the specific region being detected at the specific region detecting step;

a display control step of displaying the composite image created at the composite image creating step on a display apparatus;

a process performing step of performing a process for implementing the function provided to the information device;

a position specification accepting step of accepting a specification of a position within the composite image displayed at the display control step;

a position determining step of determining whether the position based on the specification accepted at the position specification accepting step belongs to the specific region or other region;

a position information supplying step of supplying information indicating a position within the information device image to the process performing step, when the position determining step includes determining that the position based on the specification belongs to the specific region, the position within the information device image being determined from the position based on the specification; and a first drag operation detecting step of detecting a first drag operation, based on the specification accepted at the position specification accepting step, the first drag operation being a drag operation crossing a boundary between the specific region and the other region, and a starting point of the drag operation being in the other region, wherein the process performing step includes performing the process for implementing the function, based on the information supplied from the position information supplying step, and when the first drag operation detecting step includes detecting the first drag operation, the position information supplying step does not supplying information indicating a position within the information device image to the process performing step until the first drag operation is no longer detected at the first drag operation detecting step.

5. A non-transitory computer-readable recording medium that stores therein a computer program for causing a computer to perform an image combining method, the method comprising:

an image receiving step of receiving from an information terminal an information terminal image having a specific region composed of pixels having a same feature value, the feature value being luminance or chromaticity;

a specific region detecting step of detecting the specific region within the information terminal image, based on feature values of pixels composing the information terminal image received at the image receiving step;

an information device image creating step of creating an information device image related to a function provided to an information device;

a composite image creating step of creating a composite image where the information device image created at the information device image creating step is embedded in the specific region within the information terminal image, the specific region being detected at the specific region detecting step;

a display control step of displaying the composite image created at the composite image creating step on a display apparatus;

a process performing step of performing a process for implementing the function provided to the information device;

a position specification accepting step of accepting a specification of a position within the composite image displayed at the display control step;

a position determining step of determining whether the position based on the specification accepted by position specification accepting step belongs to the specific region or other region;

a position information supplying step of supplying information indicating a position within the information device image to the process performing step, when the position determining step includes determining that the position based on the specification belongs to the specific region, the position within the information device image being determined from the position based on the specification; and a first drag operation detecting step of detecting a first drag operation, based on the specification accepted at the position specification accepting step, the first drag operation being a drag operation crossing a boundary between the specific region and the other region, and a starting point of the drag operation being in the other region, wherein the process performing step includes performing the process for implementing the function, based on the information supplied from the position information supplying step, and when the first drag operation detecting step includes detecting the first drag operation, the position information supplying step does not include supplying information indicating a position within the information device image to the process performing step until the first drag operation is no longer detected by the first drag operation detecting step.

* * * * *